(12) United States Patent
Barley et al.

(10) Patent No.: US 8,495,970 B2
(45) Date of Patent: Jul. 30, 2013

(54) FEED DISPENSER

(71) Applicants: Christopher B. Barley, Grand Prairie, TX (US); James Brandon Roach, Grand Prairie, TX (US)

(72) Inventors: Christopher B. Barley, Grand Prairie, TX (US); James Brandon Roach, Grand Prairie, TX (US)

( * ) Notice: Subject to any disclaimer, the term of this patent is extended or adjusted under 35 U.S.C. 154(b) by 0 days.

(21) Appl. No.: 13/722,162

(22) Filed: Dec. 20, 2012

(65) Prior Publication Data

US 2013/0104807 A1 May 2, 2013

Related U.S. Application Data

(62) Division of application No. 11/879,122, filed on Jul. 16, 2007, now Pat. No. 8,336,492.

(51) Int. Cl.
*A01K 61/02* (2006.01)

(52) U.S. Cl.
USPC .......................................................... 119/51.04

(58) Field of Classification Search
USPC ...................... 119/51.04, 51.01, 57.92, 57.91
See application file for complete search history.

(56) References Cited

U.S. PATENT DOCUMENTS

| | | | | | |
|---|---|---|---|---|---|
| 2,619,355 | A | * | 11/1952 | Trees | 239/656 |
| 2,947,544 | A | * | 8/1960 | Hurt | 239/656 |
| 3,195,508 | A | * | 7/1965 | Lehman et al. | 119/51.11 |
| 5,368,192 | A | * | 11/1994 | Ransom, II | 221/277 |
| 5,732,652 | A | * | 3/1998 | Allen | 119/57.91 |
| 7,222,583 | B2 | * | 5/2007 | Foster et al. | 119/57.91 |
| 2003/0034308 | A1 | * | 2/2003 | Uefuji et al. | 210/663 |

* cited by examiner

*Primary Examiner* — Richard Price, Jr.
(74) *Attorney, Agent, or Firm* — Geoffrey A. Mantooth

(57) ABSTRACT

An improved animal feed dispenser is provided having a slow speed paddle wheel and a high speed distributor wheel. The high speed distributor wheel transports feed out of an opening in the device to spread it on the ground. The slow speed paddle wheel moves feed at a measured rate from a storage hopper and feeds it to the distributor wheel. A detachable mounting plate is used to attach the dispenser to a storage hopper, and is releasable therefrom without emptying the hopper of feed. The slow speed paddle wheel is formed from a material flexible enough to prevent feed jams caused by water absorption of the feed and other events.

6 Claims, 9 Drawing Sheets

FEED DISPENSER

This application is a divisional of U.S. application Ser. No. 11/879,122 filed Jul. 16, 2007.

BACKGROUND OF THE INVENTION

1. Field of the Invention

The present invention relates generally to feeder equipment, and more specifically to an improved device for dispersing animal and fish feed.

2. Description of the Prior Art

Feeding of wildlife and fish using automated feeders is well known in the art. Numerous designs for such automated feeders have been used, and most, if not all, of such designs have one or several drawbacks.

An important general issue related to such feeders is that of reliability. Automated feeders can jam in use, and the unattended nature of such devices means that a jam may go undetected for an extended period of time. A feed jam means that the desired function of providing feed to wildlife is not implemented. Further, such jams can cause damage to the feeder itself, such as burning out a drive motor or bending a portion of the feeder. Animal feed is highly hygroscopic, so it swells and becomes sticky over time. Because of this, feed jams are relatively common in currently available feeder designs.

Current designs also do not lend themselves to easy maintenance in the field. In order to clear a jam, typically a portion of the feeder must be disassembled, and the current designs do not make this process simple. It is often difficult to determine exactly what the cause of the jam even is, in many cases.

Current feeder designs are usually relatively large and bulky, making them difficult to transport and set up. They are also difficult to attach and remove from commonly available feed buckets and hoppers.

It would be desirable to provide an improved animal feed dispenser that is both simple to use and easy to maintain. It is preferable for such a device to be relatively inexpensive of manufacture, easy to use and clear in the field, reliable, small in size, and capable of easy attachment to and removal from a feed hopper.

SUMMARY OF THE INVENTION

In accordance with the present invention, an improved animal feed dispenser is provided having a slow speed paddle wheel and a high speed distributor wheel. The high speed distributor wheel transports feed out of an opening in the device to spread it on the ground. The slow speed paddle wheel moves feed at a measured rate from a storage hopper and feeds it to the distributor wheel. A detachable mounting plate is used to attach the dispenser to a storage hopper, and is releasable therefrom without emptying the hopper of feed. The slow speed paddle wheel is formed from a material flexible enough to prevent feed jams caused by water absorption of the feed and other events.

BRIEF DESCRIPTION OF THE DRAWINGS

The following description is a preferred embodiment of the invention, and is used for illustrative purposes. The invention will be better understood by the following description taken together with the drawings, in which.

DETAILED DESCRIPTION OF THE INVENTION

As will be appreciated by those skilled in the art, the following description of a preferred embodiment is illustrative rather than limiting. Additional features may be added to a feed device without changing the nature of the invention, and various alternative design details will become apparent to those skilled in the art.

The feed dispenser described herein is a self contained unit that is suitable for use with almost any feed hopper available on the market. It can be mounted in a fixed installation, or used with a portable feed device. As will be appreciated by those skilled in the art, the adaptability and flexibility of its design solves most of the problems that are common with currently available feed dispensers.

Figure 1:
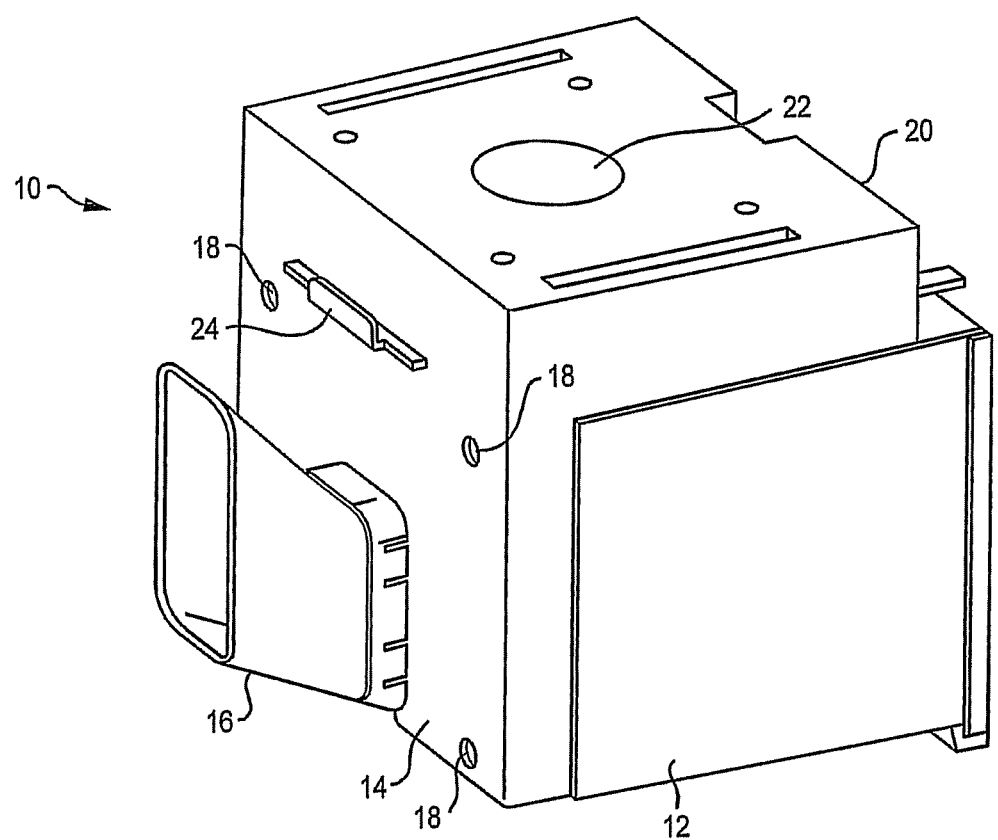
FIG. 1 is a perspective view of an assembled feed dispenser in accordance with a preferred embodiment of the present invention.

Referring to FIG. 1, a feed dispenser 10 includes a main casing 12 having attached thereto a front plate 14. A dispenser chute 16 is attached to the front of front plate 14, and directs feed that is expelled form the unit. Front plate 14 is preferably attached to main casing 12 using four screws 18, only three of which are visible in FIG. 1.

Adapter housing 20 is attached to the top of casing 12, and has an opening 22 therein through which feed flows. Details of adapter housing 20 and the preferred technique for attaching it to a feed hopper are described in connection with FIGS. 7-9. The flow of feed into the dispenser can be blocked using blocking plate 24 as described later. In normal operation, feed drops through opening 22 into the interior of casing 12, and is ejected at a high velocity through dispenser chute 16.

Figure 2:
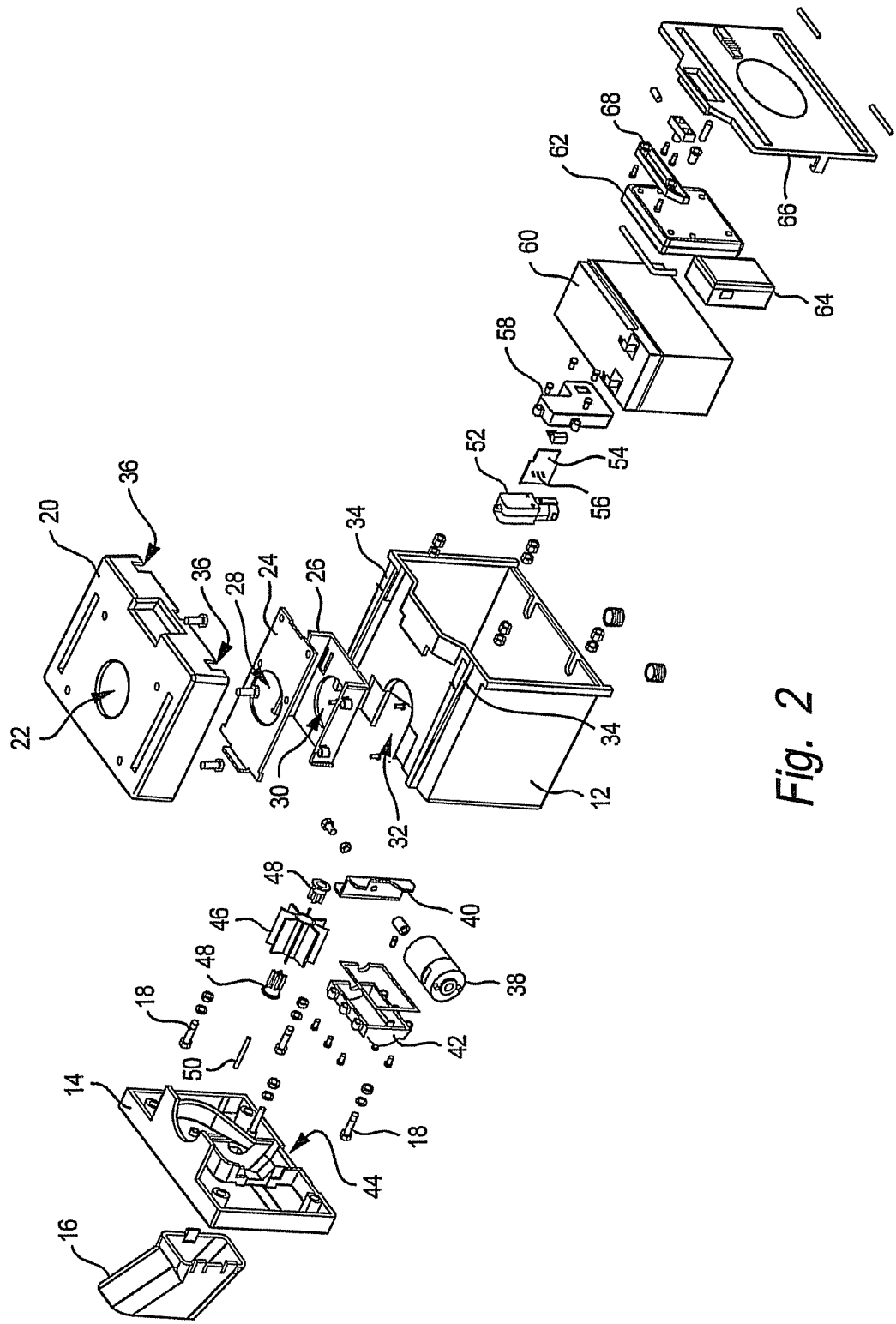
FIG. 2 is an exploded view of the dispenser unit of FIG. 1.

FIG. 2 is an exploded diagram of dispenser 10, showing most of the parts used to construct same. Blocking plate carrier 24 is attached to adapter housing 20 using screws, and supports and carries blocking plate 24. Blocking plate 24 is able to slide forward (to the left in the drawing). When blocking plate 24 is pushed toward the rear of the device (to the right in the drawing), blocking plate opening 28 is aligned with opening 22, allowing feed to fall, under the influence of gravity, into the interior of casing 12. Opening 22 forms a cylinder, or tunnel, that extends downward to the plane defined by the top of blocking plate 24. This constrains feed to move only in alignment with the various openings, and acts in conjunction with blocking plate 24 to completely stop feed flow when blocking plate 24 is pulled forward. Opening 30 in blocking plate carrier 26, and notch 32 in the casing 12, are aligned with opening 22 at all times.

Adapter housing 20 preferably is easily removable from casing 12. In the preferred embodiment, this is accomplished using tabs 34 and notches 36 that engage tabs 34. Depressing tabs 34 enables the adapter housing 20 to slide off of casing 12. When the adapter is mounted to a relatively fixed hopper, casing 12 is actually moved relative to adapter housing by sliding casing 12 back to remove it. Tabs 34 act to hold the adapter housing 20 and casing 12 in a fixed relationship except when removal is intended.

Electric motor 38 is mounted substantially horizontally, and impeller 40 is attached thereto. Although a horizontal orientation for motor 38 is preferred, other orientations can be used to good effect if desired. An interior front plate (not shown in FIG. 2) is attached to casing 12, and motor 38 is attached to it. Motor cover 42 holds motor 38 and impeller 40 in place, and is attached to the interior front plate. Impeller 40 is aligned with opening 44 in front plate 12, which is turn is aligned with chute 16.

Motor 38 preferably operates at a high speed, and in the preferred embodiment operated at approximately 12,000 rpm. This high impeller speed not only distributes feed at a significant distance using a very small impeller, but also operates to prevent feed jams at the impeller. The high speed will tend to cut through any feed pellets that are in a position to otherwise jam the impeller.

The interior of front plate 12 and the interior front plate (not shown) form a chamber in which impeller 40 spins. This chamber has small clearances, so that feed cannot become stuck between the impeller and the surrounding walls of the chamber.

Feed is fed to impeller 40 at a measured rate by paddle wheel 46. Paddle wheel 46 is mounted on two gears 48 and axel 50. Paddle wheel 46 is preferably mounted horizontally, and provides a light friction fit with a surrounding chamber formed from the front plate 12 and interior front plate. Paddle wheel 46 is made from a soft rubber or similar material that can flex if any type of blockage occurs. This prevents paddle wheel 46 from jamming, and continued rotation thereof will generally clear out any blockage that starts to occur. The material used is preferably soft enough that any blockage will cause the paddle wheel arms to bend around an obstruction with very little resistance, so that the motor that drives it encounters minimal additional load due to the jam. This means that the motor and reducer unit 52 do not slow down by any appreciable amount in the event that a jam does occur. Various soft rubbers and plastics are known in the art, and are suitable for use to fabricate the paddle wheel 46.

Paddle wheel 46 is driven by motor unit 52, which includes a gear reduction assembly, as well as a motor that operates at a relatively low speed while maintaining minimal torque requirements. A relatively high torque is required, because of resistance generated by the gear reducer. In the preferred embodiment, the motor in unit 52 operates at approximately 2000 rpm, and the gear reducer causes the paddle wheel to operate at a speed preferably less than approximately 100 rpm, and preferably closer to 30 rpm. This slow turning provides a measured amount of feed to the impeller. When paddle wheel 46 is not turning, feed is blocked from passing through to the impeller.

As described in more detail in connection with FIG. 4, a printed circuit board (PCB) 54 carries a micro switch 56 that presses against a plastic pin molded into front plate 14. This pin extends rearward into the housing to contact micro switch 56. PCB 54 is attached to casing 12 in a fixed position. When front plate 14 is removed, the plastic pin no longer presses against micro switch 56. Micro switch 56 can thus sense when the front cover is removed, and prevent either motor from being turned on in such event, for safety reasons.

Mounted behind motor unit housing 58 is battery 60. Battery 60 is preferably a 6 volt battery, and provides power to both motors 38 and 52, and to electronic timer 62. An optional remote control unit 64 may also be installed, and if so is powered by battery 60 as well.

Figure 6:
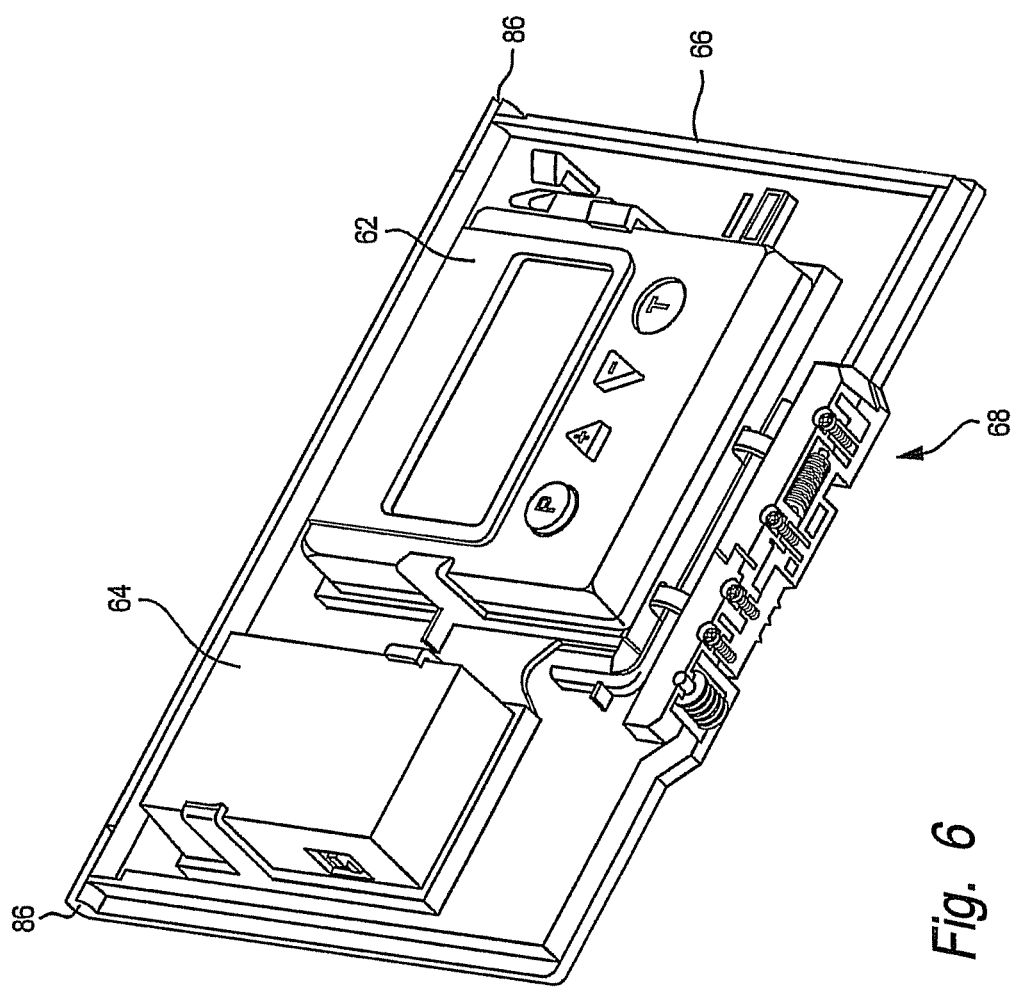
FIG. 6 is a perspective view of the inside back cover of the dispenser of FIG. 1.

Back cover 66 is used to close the back end of the device. Back cover is pivotally attached to casing 12, and latched at the upper edge thereof using spring loaded latch 68. Latch 68 is spring loaded so that simply moving a slide sideways causes the cover 66 to pop open for easy access to the interior. Timer 62 and remote control unit 64, if used, are attached to the inside surface of cover 66, and are accessible when cover 66 is opened as illustrated in FIG. 6. When cover 66 is opened, battery 60 can be removed and replaced.

In operation, timer 62 is programmed to dispense feed at selected times of day. The amount of feed to be dispensed is controlled by controlling the length of time that the two motors are activated. When motor unit 52 is off, no feed passes through the dispenser.

When a feeding interval arrives, motor 38 is first activated and given time to run up to speed. This delay is preferably a few seconds, which allows any debris in the impeller chamber to be removed before feed is provided, and to allow motor 38 to reach full rotational speed. After the start up delay, motor unit 52 is activated, causing feed to drop into the impeller chamber and be dispensed. When the feeding interval is over, motor unit 52 is stopped while motor 38 remains activated. This allows impeller 40 to completely clear out the impeller chamber within a couple of seconds. After the motor unit 52 has been shut off for several seconds, motor 38 is deactivated, and the unit remains shut off awaiting the next programmed feeding interval.

Timer 62 preferably can be programmed as known in the art to provide feed once daily, or multiple times each day. Feeding can occur at dawn and dusk, or at regular intervals throughout the day. Feeding intervals are generally selected, as known in the art, depending on the animals or fish for which feed is being provided. The unit described herein is suitable for use for all types of animal and fish feed.

Figure 3:
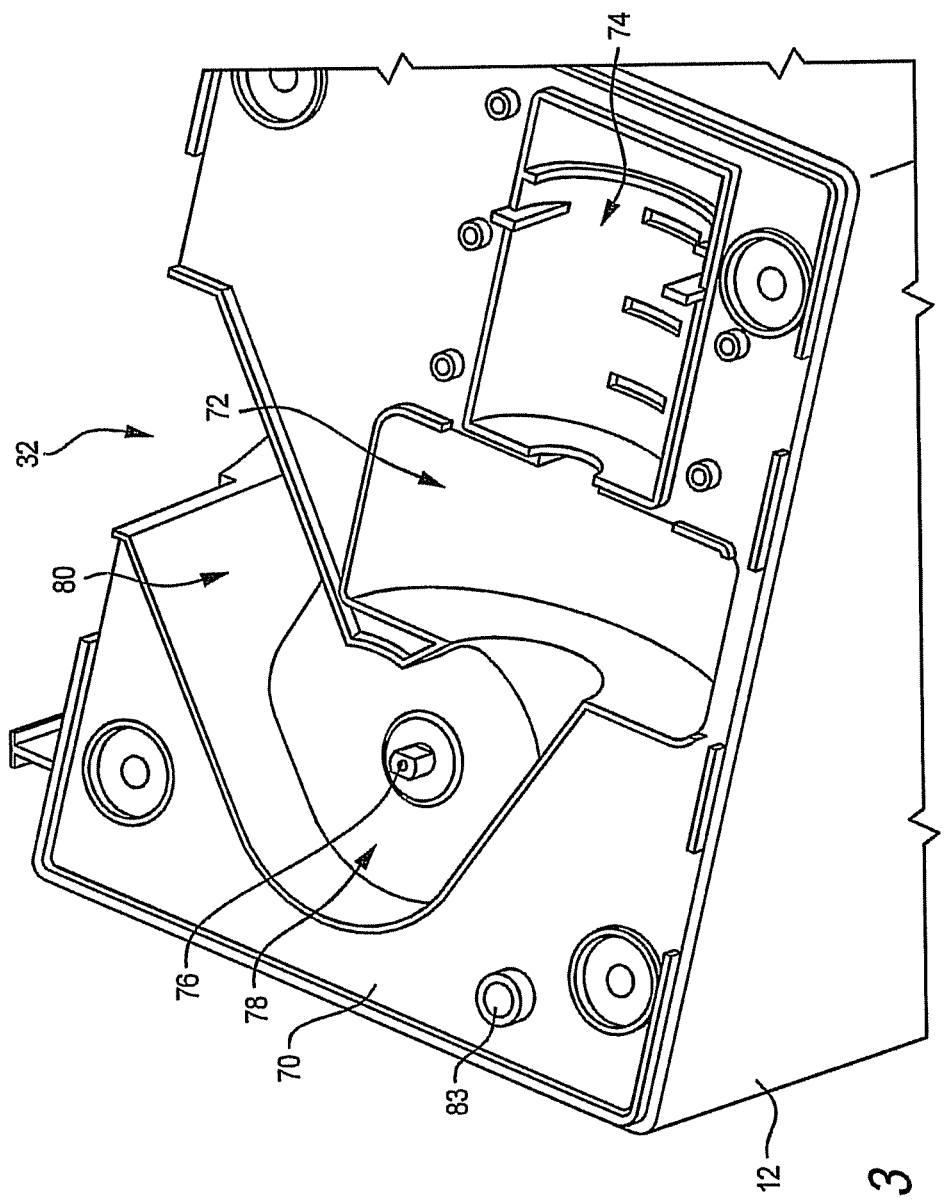
FIG. 3 is a perspective view of an interior front plate for use in the dispenser of FIG. 1.

FIG. 3 shows the interior front plate attached to the front edge of casing 12. A back half of impeller chamber 72 is formed into interior plate 70, with a corresponding portion formed into front plate 14. Chamber 74 holds motor 38 as previously described. Motor cover 42 holds motor 38 into chamber 74.

A drive shaft 76 from motor unit 52 is connected to paddle wheel 46, which rotates in a paddle wheel chamber 78 formed partially into interior plate 70. The remaining portion of chamber 78 is formed in a corresponding portion of front plate 14. Casing notch 32 connects to a passageway 80 that allows feed to fall onto the paddles of paddle wheel 46 within chamber 78 during normal operation. Thus, when both motors are operating, feed falls through slot 32, passes through passageway 80, is transported around the left side of paddle wheel chamber 78 by the paddle wheel, and drops into impeller chamber 72 to be slung at high speed out through the front opening of the dispenser.

Figure 4:
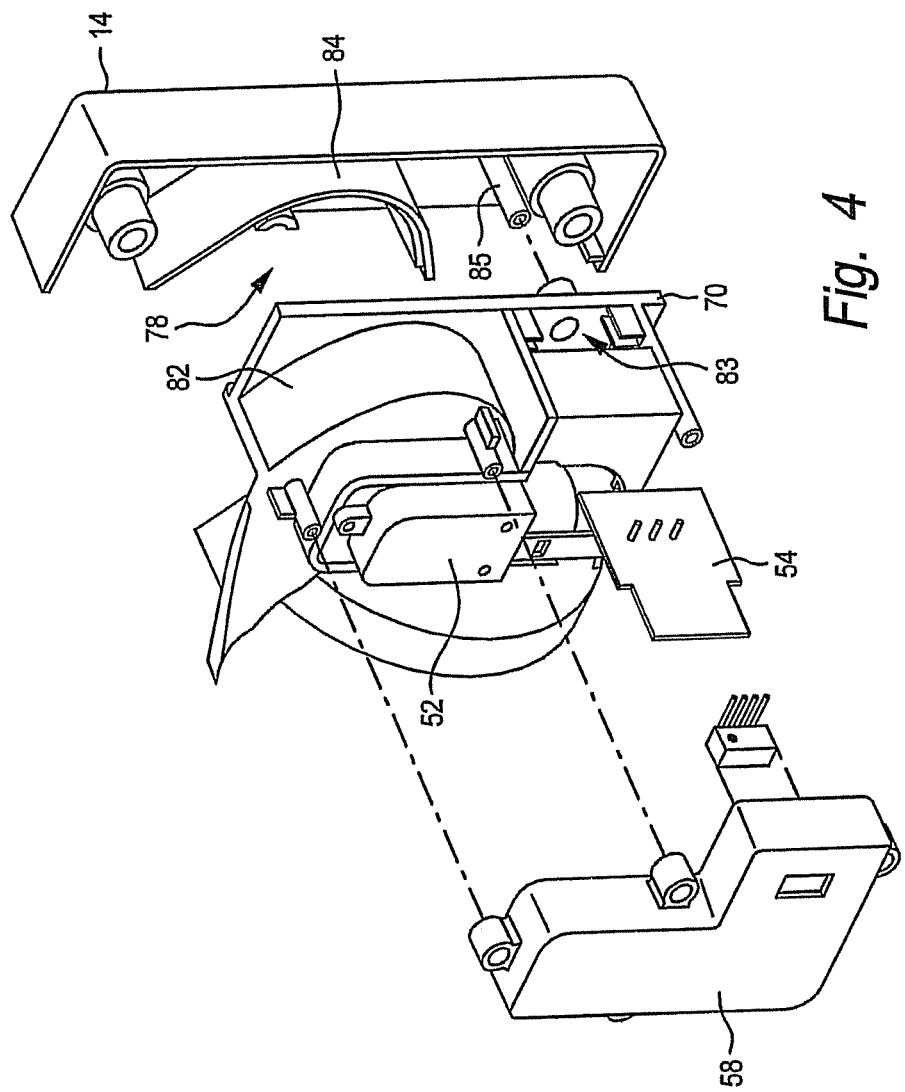
FIG. 4 is a partially exploded perspective view of a portion of the interior of the dispenser of FIG. 1.

FIG. 4 shows a portion of front plate 14 separated from interior front plate 70. Paddle wheel chamber 78 is seen to be defined in part by a wall portion 82 formed into the interior plate 70, and a corresponding wall portion 84 formed into front plate 14. Motor unit 52 is attached to interior plate 70. PCB 54 is also attached to interior plate 70.

A hole 83 in interior plate 70 is aligned with micro switch 56 (not shown in FIG. 4, being located on the far side of PCB 54). Pin 85, molded as a part of front plate 14, extends through hole 83 to make contact with micro switch 56. Such contact is made only when front plate 14 is in a closed position against interior plate 70. Once front plate 14 is moved, pin 85 no longer contacts micro switch 56. This means that micro switch senses the removal of front cover plate 14, and interrupts all connections to both motors when this occurs. This is a safety feature, and prevents the motors from being activated when the unit is opened for cleaning or maintenance.

Figure 5:
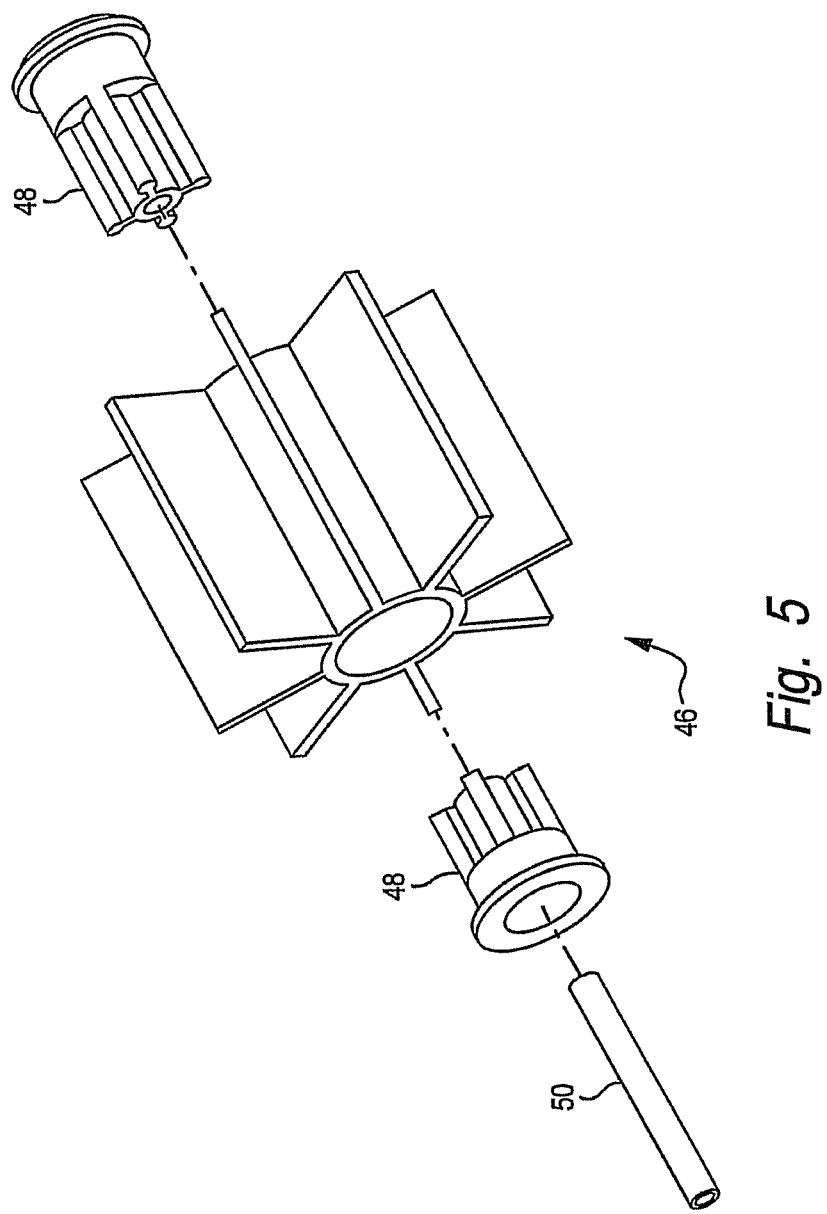
FIG. 5 is a view of the mounting hardware for a paddle wheel used in the dispenser of FIG. 1.

FIG. 5 is a close up view of paddle wheel 46. Gears 48 are ribbed, and align with ribs on the interior surface of paddle wheel 46. This prevents paddle wheel 46 from becoming stuck in place while motor unit 52 is driving it. Paddle wheel has a number of identical blades, 8 as shown in this figure, evenly spaced around its central core. Each pair of adjacent blades, in cooperation with the central core and the walls of the paddle wheel chamber, defines a fixed volume capable of holding feed pellets to be transported to the impeller chamber. Each volume is separate, and together they act to prevent feed flow when paddle wheel 46 is not rotating. This operation is similar to the operation of a revolving door to prevent air flow out of a building when the door is motionless.

FIG. 6 illustrates back cover 66 when it is opened. Pivot points 86 are at the lower edge of cover 66, with latch 68 at the top as previously described. Opening cover 66 allows it to be lowered below horizontal, at which time the timer 62 can be read and programmed. Remote control receiver unit 64 is also accessible. This remote receiver unit is used, as known in the art, to enable manual operation of the feeder using a low power radio transmitter similar to a garage door opener. Dropping cover 66 below a horizontal position also allows access to battery 60, which can be easily replaced.

Figure 7:
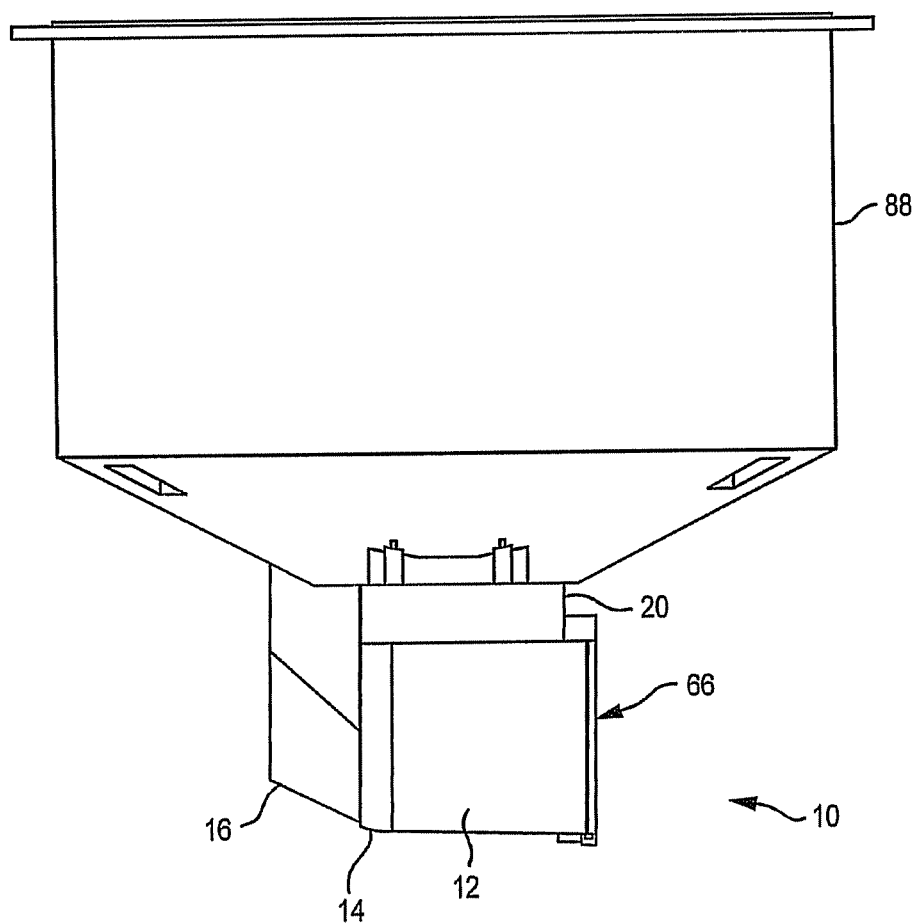
FIG. 7 is a side view of the dispenser of FIG. 1 attached to a feed hopper.

FIG. 7 shows a side view of dispensing unit 10 attached underneath a feed hopper 88. Feed is placed into hopper 88 at intervals, and generally covered against the weather. Hopper 88 has an opening in the bottom that allows feed to drop through opening 22 in adapter housing 20. FIG. 7 is the normal orientation for the dispenser 10.

Figure 8:
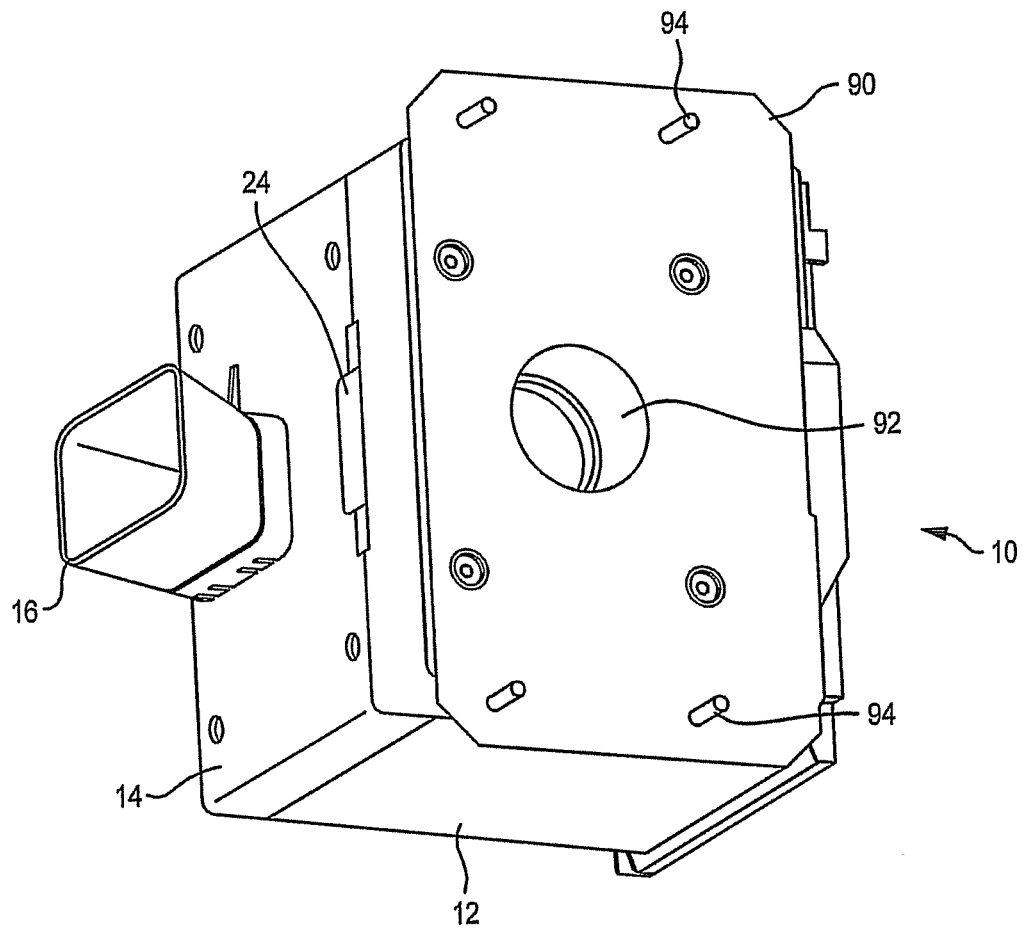
FIG. 8 is a perspective view of the dispenser of FIG. 1 showing details of the attachment structure.

Referring to FIG. 8, dispenser 10 is shown from a top perspective view with hopper 88 removed. This view shows an optional size adapter plate 90 that can be attached to adapter housing 20 to enable attachment to larger hoppers. Size adapter plate 90 also has an opening 92 to allow feed to pass through. Attachment bolts 94 are used to connect the adapter housing 20 to the hopper. If size adapter plate 90 is not used, similar bolts are provided directly in adapter housing 20 to attach it to the hopper.

Figure 9:
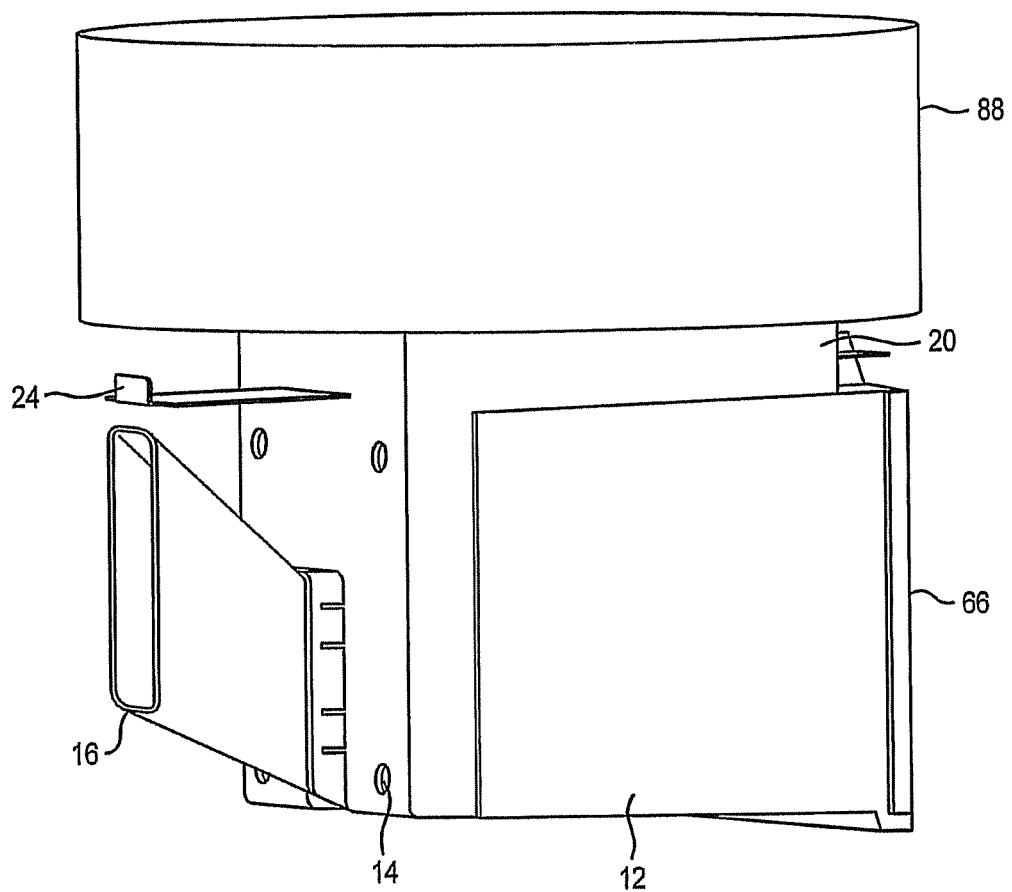
FIG. 9 is a side view of the dispenser attached to a hopper, with a blocking plate in the blocking position.

FIG. 9 illustrates the use of blocking slide plate 24 to stop flow of feed into the dispenser. When blocking plate 24 is pulled forward as shown in FIG. 9, the opening 28 therein is no longer aligned with the feed opening 22 in adapter housing 20. this completely blocks flow of feed into dispenser 10. This is only needed if dispenser 10 is removed from the hopper 88, which would otherwise allow all of the feed held in hopper 88 to run out on the ground. With the use of blocking plate 24, the dispenser 10 can be removed from hopper 88 without the need for emptying the hopper.

In the preferred embodiment, front plate 14 is made from a clear plastic, which allows the interior of the unit to be seen up to the interior front plate 70. This means that the impeller chamber 72, the paddle wheel chamber 78, and the feed passageway 80 can be viewed without removing any covers. This allows visual inspection of the interior to determine the cause of any failure to dispense feed, such as caused by a jam. IF a jam occurs that will not clear itself, front plate 14 can be removed to clear the jam.

With the described mechanism, using a slowly rotating paddle wheel and a high speed impeller as described, feed jams are rare. Measured amounts of feed are delivered to the impeller. Unlike many current systems, in which the amount of feed delivered is a function of gravity, and feed moisture and stickiness, with the present invention the volume of feed delivered by the paddle wheel is fairly constant. This is because the volume of each paddle wheel chamber is constant, and the rotation speed of the paddle wheel is constant and known. Feed volume is the product of the rotational rate of the paddle wheel, volumes of the individual paddle wheel chambers, and the time that the paddle wheel is activated.

Preferably, small openings, or weep holes, are provided at the junction of the dispenser chute 16 and front plate 14. This prevents water from building up in the impeller chamber. The impeller chamber is angled so that the junction of the front plate 14 and dispenser chute 16 is the lowest point through which the feed pellets pass through the device.

Weatherproof gaskets are preferably provided around both motors, the gear reduction assembly, and the micro switch. This prevents moisture from interfering with the operation of these devices.

The device described herein is rugged and reliable, and almost impervious to jamming as a result of the feed absorbing moisture. Because the front cover is easily removed for servicing, any jams that do occur can be easily corrected. The overall device is quite compact, being much smaller than anything currently available on the market. The preferred embodiment described above fits approximately in a cube 9 inches on a side, and is very effective at dispersing feed over a large area.

Most of the parts used to fabricate dispenser 10 are injection molded plastic, which is relatively inexpensive to manufacture and sturdy. Most of the parts are preferably a polypropylene having a high IZOD rating, which is durable in the outdoor environment in which these devices are used. The front cover plate 14 is preferably formed from a clear polycarbonate, allowing any feed jams to be easily viewed without removing front plate 14. If a jam occurs, front plate 14 can be easily removed, as previously described, in order to deal with it. The polycarbonate used to make cover plate 14 is also extremely durable, for use in the field.

Blocking plate 24 is made of a thin sheet of stainless steel or similar material. This allows plate 24 to be made very thin, and still string enough to perform both a blocking function, and have an edge thin enough to cut through any feed that happens to be in the way when blocking plate 24 is moved to the closed position. Thus, the inner edge of the blocking plate opening 28 acts as a knife edge to cut any feed pellets in the way, allowing blocking plate 24 to be moved to the closed position even when the hopper is full of feed.

As previously described, paddle wheel 46 is made from a soft rubber or similar material. Impeller 40, on the other hand, is made from a strong, rigid material. Preferably, stainless steel or a galvanized metal is used for strength and water resistance. A hard and sturdy plastic may also be used, if desired.

While the invention has been shown in only one of its forms, it is not thus limited but is susceptible to various changes and modifications without departing from the spirit thereof.

What is claimed is:

1. A feed dispensing device, comprising:
   a housing having a feed discharge chute at a front side thereof;
   a first motor mounted inside the housing and having in impeller connected thereto, wherein the impeller is located so as to propel feed through the discharge chute;
   a second motor mounted inside the housing and having a paddle wheel connected thereto, wherein the paddle wheel is located so as to drop feed to the impeller when the second motor is operated, and wherein the paddle wheel is further located so as to block feed from flowing down through an opening in a top of the housing when the second motor is not operated;

a feed hopper for holding feed to be dispensed;

an adapter connected to the top of the housing and the lower portion of the hopper, wherein the adapter is separable into two parts, and wherein a first part remains connected to the hopper, and a second part remains connected to the housing, when a separation occurs, and further wherein the adapter includes a blocking plate within the adapter first part, wherein the blocking plate is operable to block flow of feed from the hopper when a separation occurs;

a controller mounted inside the housing for separately operating the first and second motors during a feeding cycle, wherein the controller is operated to run a feeding cycle at preselected intervals.

2. The feed dispensing device of claim 1, wherein a portion of the housing is removable adjacent the discharge chute, and further comprising a switch, operable by removing the removable portion of the housing, which acts to prevent operation of the motors when the removable portion is removed.

3. The feed dispensing device of claim 1, further comprising:

an access door located on a back side of the housing, wherein the controller is accessible when the access door is opened.

4. The feed dispensing device of claim 1, wherein the controller is mounted on an inside surface of the access door, and further comprising:

a spring loaded lock on the access door, such spring loaded lock including a slider on the access door, and a spring between the access door and a portion of the housing, wherein moving the slider to one side frees the spring to pop the access door partially open.

5. An adapter for attaching a feed dispenser housing, having an opening in an upper surface thereof, to a feed hopper having an opening in a lower portion thereof, comprising:

an adapter upper portion having an opening therethrough, and having a connector for connecting to the feed hopper lower portion so as to align with the feed hopper opening;

an adapter lower portion having an opening therethrough, and having a connector for connecting to the feed dispenser housing so as to align with the housing opening, wherein the adapter upper and lower portions, when connected together, define a passage between the upper adapter opening and the lower adapter opening that allows passage of feed therethrough;

a releasable connector connected to the adapter upper and lower portions to allow them to be separated;

a blocking device connected to the upper adapter housing, wherein the blocking device has a first and a second position, and wherein in the first position the blocking device allows feed to flow through the adapter upper portion, and wherein in the second position the blocking device prevents feed from flowing through the upper adapter portion.

6. The adapter of claim 5, wherein the blocking device comprises a planar blocking plate having a hole therein, and wherein in the first position the blocking plate blocks flow of feed through the upper portion opening, and wherein in the second position the blocking plate opening is aligned with the upper portion opening so as to allow feed to flow therethrough.

* * * * *